(12) United States Patent
Gaudin et al.

(10) Patent No.: US 8,359,834 B2
(45) Date of Patent: Jan. 29, 2013

(54) APPARATUS AND METHOD FOR INJECTION OF A FLUID FOR AN EXHAUST GASES TREATMENT DEVICE

(75) Inventors: Bruno Gaudin, Chozeau (FR); Mourad Hedna, Lyons (FR); Philip Meier, Hagerstown, MD (US); James E. Marsden, Hagerstown, MD (US)

(73) Assignee: Renault Trucks, St. Priest (FR)

( * ) Notice: Subject to any disclaimer, the term of this patent is extended or adjusted under 35 U.S.C. 154(b) by 393 days.

(21) Appl. No.: 12/809,405

(22) PCT Filed: Dec. 21, 2007

(86) PCT No.: PCT/IB2007/004422
§ 371 (c)(1),
(2), (4) Date: Sep. 20, 2010

(87) PCT Pub. No.: WO2009/081228
PCT Pub. Date: Jul. 2, 2009

(65) Prior Publication Data
US 2011/0016854 A1 Jan. 27, 2011

(51) Int. Cl.
*F01N 3/20* (2006.01)
(52) U.S. Cl. ............... 60/286; 60/287; 60/295; 60/303
(58) Field of Classification Search .............. 60/286, 60/287, 295, 301, 303
See application file for complete search history.

(56) References Cited

U.S. PATENT DOCUMENTS
2008/0295492 A1* 12/2008 Karkkainen et al. ............ 60/286

FOREIGN PATENT DOCUMENTS
| EP | 0849443 A1 | 6/1998 |
| EP | 1655463 A | 5/2006 |
| EP | 1676628 A | 7/2006 |
| EP | 1176292 B | 9/2006 |
| WO | 2007091969 A1 | 8/2007 |

OTHER PUBLICATIONS

International Search Report for corresponding International App, PCT/IB2007/004422.
Chinese Official Action from corresponding Chinese Application 200780102033.t.

* cited by examiner

*Primary Examiner* — Thomas Denion
*Assistant Examiner* — Jorge Leon, Jr.
(74) *Attorney, Agent, or Firm* — WRB-IP LLP

(57) ABSTRACT

An apparatus is provided for injection of a fluid for an exhaust gases treatment device of an internal combustion engine arrangement. The apparatus includes a fluid injector fed from a source of fluid under pressure through a fluid conduit, a feed valve in the fluid conduit between the source of fluid the said injector, a purge system including a gas conduit connecting a source of pressurized gas to the fluid conduit, a pressure limiter within the gas conduit, and a check valve downstream of the pressure limiter. The pressure limited by the pressure limiter is lower than the pressure of fluid delivered by the source of fluid.

15 Claims, 2 Drawing Sheets

APPARATUS AND METHOD FOR INJECTION OF A FLUID FOR AN EXHAUST GASES TREATMENT DEVICE

BACKGROUND AND SUMMARY

The invention pertains to the field of apparatus for injection of a fluid for an exhaust gases treatment device of an internal combustion engine arrangement.

It is known to install a Diesel Particulate Filter, or "DPF", on an exhaust line of a Diesel engine in order to temporarily store soot and non-burnt particles present in the exhaust gases of such an engine. Such a DPF must be regularly cleaned by oxidation of the particulate materials. In order to obtain such an oxidation, the temperature of the exhaust gases must be substantially increased. This can be achieved thanks to a burner installed in the exhaust line of the engine next to the DPF. This can also be achieved thanks to an oxidation catalyst installed in the exhaust line, upstream of the DPF. In both cases, fuel is injected in the exhaust line, either to be burnt by the burner or to come into contact with the catalyst. In both cases, the temperature of the exhaust gases increases when they enter the DPF, which enables full oxidation of the particulate materials in the DPF.

It is also known to equip diesel engine arrangements with a device for removing nitrogen oxides from the exhaust gases using selective catalytic reduction, which involves injection of a nitrogen containing fluid, such as a urea-water solution, in the exhaust gases upstream of a dedicated catalytic converter.

Therefore, many engine arrangements are equipped with an apparatus for injection of a fluid for an exhaust gases treatment device. In many cases, such an apparatus includes a fluid injector which is fed from a source of fluid under pressure through a fluid conduit, and which is adapted to inject fluid in the flow of exhaust gases within an exhaust line of said engine arrangement and upstream of said treatment device. In many cases, the injector is electromagnetically controlled. It is known to provide a feed valve in the fluid conduit between said source of fluid and said injector for controlling the delivery of fluid.

One key aspect of these fluid injection systems is that they operate usually only intermittently, only under certain engine operating conditions. The rest of the time, no fluid is injected by the system. During those times where the system is inoperative, the fluid contained in the system may be subject to degradation. For example, the injector is close to the exhaust line and is therefore subject to quite high temperatures. In case of a system for injecting fuel, the fuel trapped in the injector may be subject to coking, which brings the deposit of carbon substances inside the injector, which may cause the injector to become jammed. Therefore, it is known to equip such an injection apparatus with a purge system for purging the fluid conduit, said purge system comprising a gas conduit connecting a source of pressurized gas to the fuel conduit so that the gas pressure can be used to purge at least part of the conduit. According to a known system, the purge system is equipped with its own electromagnetically controlled valve for controlling the purge operation.

Of course, this additional purge valve is a source of cost, especially if it is taken into account the control unit which is needed for its control. Such a purge system is also rather cumbersome, which is more and more a problem when it comes to integrating the system on a vehicle where space is more and more limited.

Therefore, there is a need to provide an injection apparatus with a purge system that is both cheap and effective, and less cumbersome that the existing designs.

According to an aspect of the present invention, an apparatus is provided for injection of a fluid for an exhaust gases treatment device of an internal combustion engine arrangement, said apparatus including:
an electromagnetically controlled fluid injector fed from a source of fluid under pressure through a fluid, conduit, and adapted to inject fluid in a flow of exhaust gases within an exhaust line of said engine arrangement;
a feed valve in the fluid conduit between said source of fluid and said injector for controlling the delivery of fluid;
a purge system for purging the injector, said purge system comprising a gas conduit connecting a source of pressurized gas to the fluid conduit;
characterized in that the purge system further comprises:
a pressure limiter within said gas conduit; and
a check valve downstream of said pressure limiter for preventing backflow from the fluid conduit towards the gas source, and in that
the pressure limited by said pressure limiter is lower than the pressure of fluid delivered by the source of fluid in the fluid conduit downstream of the feed valve.

DETAILED DESCRIPTION

Figure 1:
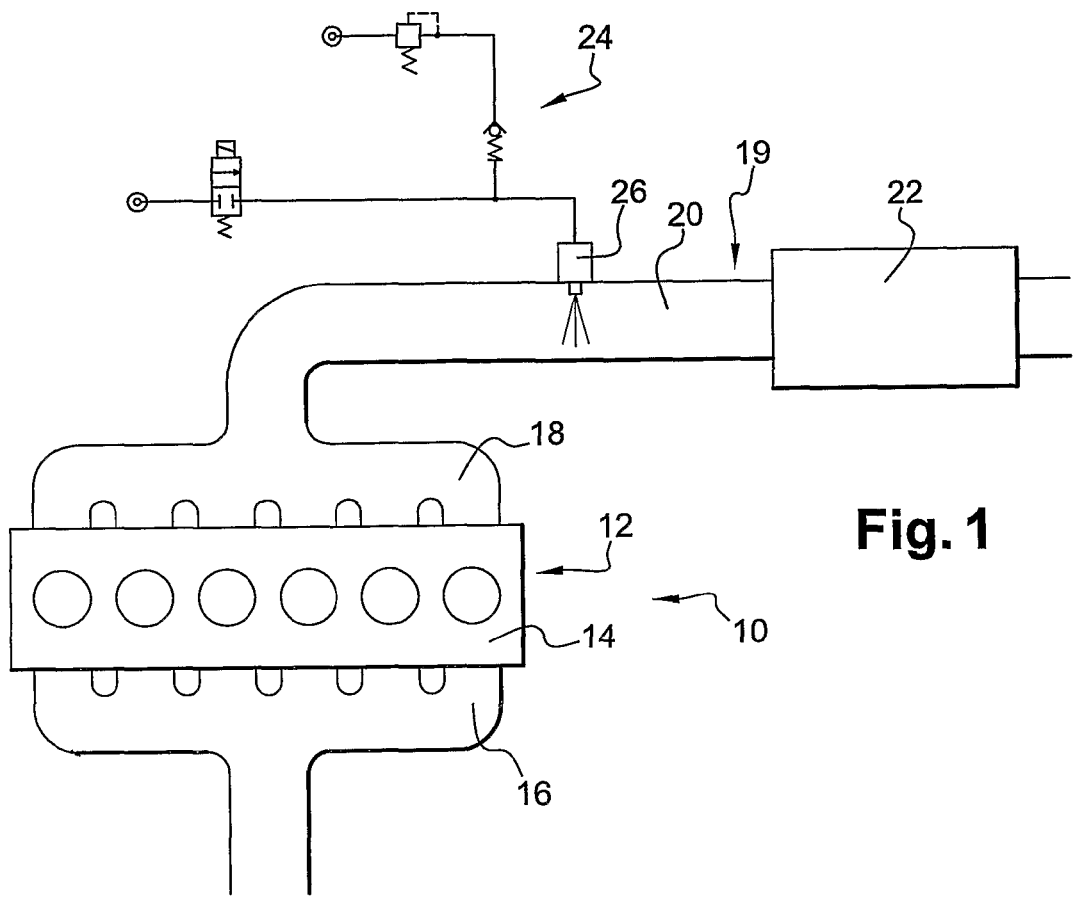
FIG. 1 is a schematic diagram showing an engine arrangement having an apparatus according to the invention.

On FIG. 1 is represented a part of an engine arrangement which can be used for powering a stationary machine, but which can also be fitted for example in a vehicle, such as an industrial truck, or in a machine such as a construction equipment machine.

The engine arrangement 10 comprises an engine 12, such as a 6 cylinder in-line turbocharged diesel engine. The engine 12 comprises an engine block 14, an intake manifold 16 and an exhaust manifold 18, plus numerous other components not represented on the figure. The exhaust manifold 18 is part of an exhaust line 19 and collects the exhaust gases from the cylinders into at least one exhaust pipe 20. The exhaust line 19 may comprise many other components which are not shown on the figure, such as one or several turbines, an exhaust gas recirculation (EGR) system, an exhaust silencer, etc. On FIG. 1 is represented an exhaust gas treatment device 22 which has the purpose of modifying the chemical composition of the exhaust gases in order to limit the amount of toxic substances which are susceptible to be emitted by the engine arrangement to the atmosphere through the exhaust system. The exhaust gas treatment device can be of many types, but it will be focused here on devices which necessitate the injection of a fluid in the exhaust gases to achieve the desired treatment of gases, the treatment being possibly only partial. Therefore, the engine arrangement is equipped with an apparatus 24 for injection of a fluid within the exhaust line 19. In the shown embodiment, the apparatus has an injector 26 for injecting the fluid directly in the exhaust pipe 20, upstream of the treatment device. Nevertheless, the invention would also be applicable to systems where the fluid is injected within the device 22 itself, or downstream of the device. It could also be applicable to an apparatus for injecting the fluid within the engine itself, as it is known to inject such kind of fluid directly in the engine cylinder(s) for treating the gases generated by the combustion directly in the cylinder. In the latter case, the exhaust gas treatment device will be the cylinder itself. The exhaust line can be equipped with means to enhance the mixing of exhaust gases with the fluid injected by injector 26.

The treatment device 22 could be for example a diesel particulate filter (DPF) or a selective catalytic reduction (SCR) converter. In both cases, the fluid to be injected in the exhaust line is in liquid form, be it fuel or a water/urea solution.

In the following description, it will be considered the case where the apparatus is adapted to inject fuel upstream of a DPF treatment device.

Figure 2:
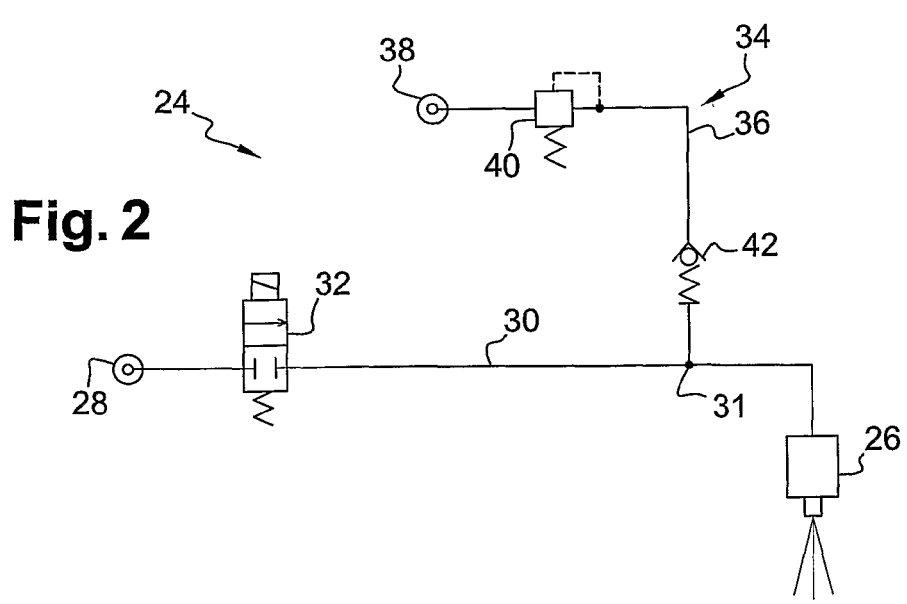
FIG. 2 is a schematic diagram showing a basic embodiment of an apparatus according to the invention.

On FIG. 2 is depicted a basic embodiment of an apparatus 24 according to the invention. First of all, the apparatus 24 comprises an electromagnetically controlled injector 26 which is fed from a source of fluid under pressure 28 through a fluid conduit 30. The source of fluid under pressure 28 can be a dedicated system, especially when the fluid to be injected is specific to the treatment device, such as the water/urea solution which is to be injected upstream of a SCR catalytic converter. The source of fluid 28 can also be shared with other components of the engine. For example, in the case of a DPF where the fluid to be injected is fuel, it would be of course advantageous to use a common pressurized source for the engine fuel injection system and for the apparatus according to the invention. For example, the common source of pressurized fuel could be a low pressure pump of the engine fuel injection system. The injector is adapted to inject fluid in a flow of exhaust gases within the exhaust pipe 20.

The apparatus also comprises a feed valve 32 in the fluid conduit between said source of fluid and said injector for controlling the delivery of fluid. The feed valve 32 is provided mainly for safety reasons, in case a failure of the injector would result in it staying in its open position. With the safety valve, it is ensured that no fuel is injected in the exhaust line if it is not needed. The feed valve has therefore the function of a shut-off valve. Preferably, the feed valve 32 is an electromagnetically controlled valve.

Although not shown on the drawings, the injector 26 and the electromagnetically controlled feed valve 32 are controlled by an electronic control unit (ECU), preferably by the same ECU which may in fact be common with a main engine fuel injection ECU. To inject fuel in the exhaust line, the ECU shall control both the feed valve and the injector to an open position so that the fuel under pressure is propelled into the exhaust pipe.

According to the invention, the apparatus 24 also comprises a purge system 34 for purging at least the injector 26, said purge system comprising a gas conduit 36 connecting a source of pressurized gas 38 to the injector 26. The purge system is therefore an active system using a pressurized gas to remove any other fluid from the injector 26. The purge system is therefore more efficient than a drain system where the pressure of the fluid itself is used to evacuate the fluid.

Preferably, the gas conduit 36 is connected not to the injector 26 itself, but to the fuel conduit 30 at a junction 31. Indeed, this allows using a non-modified injector, not having a purge air port, and this allows purging at least part of the fuel conduit 30, especially the part which is the closest to the injector. That part of the fuel conduit 30 is prone to be quite close to the exhaust line and therefore to be subject to high temperatures.

The source of pressurized gas may be of different kinds. In the case of a commercial truck, it is well known to have a compressed air system where air is compressed and stored to perform a variety of functions, including the activation of the brakes, the pressurization of an air spring suspension, etc. In such a case, it would of course be economical to use the same compressed air system as the source of pressurized gas.

According to one aspect of the invention, the purge system 34 is devoid of any controlled valve. This has of course the advantage of achieving a low cost design because it saves the cost of such a controlled valve and of the corresponding control circuitry. Indeed, even if an additional valve could be controlled by the same ECU as the injector, it would inevitably increase the price of the ECU if it had to control another valve.

As shown on FIG. 2, the purge system 34 comprises a pressure limiter 40 which is located within the gas conduit between the pressurized gas source 38 and the junction with the fluid conduit 30. Preferably, the pressure limiter is chosen so that the pressure of gas flowing downstream of the limiter 40 is lower than the pressure of fluid delivered by the source of fluid in the fluid conduit downstream of the feed valve. The purge system is also preferably equipped with a check valve 42 downstream of the pressure limiter 40, for preventing backflow from the fluid conduit 30 towards the gas source 38. The pressure limiter can be embodied as a pressure regulator or any known equivalent to the man in the art. The check valve 42 can be integrated within the pressure limiter 40.

For example, the pressure limiter is constructed as a conventional pressure regulator. Alternatively, a check valve with an opening pressure greater than the difference between the gas pressure and the fluid pressure could be used.

In the example shown, the low pressure pump which may be used as the pressurized fluid source 28 may for example deliver fuel under a pressure which, depending on engine operating conditions, may vary between 2.5 and 6 bars. In such a case, the pressure limiter 40 will be chosen for example so that it will limit the downstream pressure at around 2 bars, plus or minus 0.3 bar.

Since the gas pressure regulated by the limiter 40 is lower than the fluid pressure, whenever the feed valve 32 is opened, the fluid pressure will force the check valve 42 to close, which will interrupt any communication between the injector 26 and the gas source 38. Therefore, opening and closing of the injector will simply control the injection of fluid in the exhaust line.

To the contrary, if the feed valve 32 is closed and the injector 26 is opened, the fluid pressure in the fluid conduit 36 will automatically drop below the pressure regulated by the limiter 40, so that the gas pressure will force the check valve 42 to open, letting pressurized gas flow in the fluid conduit 30 and in the injector 26, which will achieve the goal of purging the fluid which had remained therein after the feed valve 32 has been closed.

With the feed valve still closed, the injector 26 can be controlled to be closed also, thereby interrupting the purging process.

As seen above, this new design of a purge system ensures that pressurized gas is automatically delivered by the purge system to the fluid conduit when the injector is open and when the feed valve is closed, and that no gas can be delivered by the purge system to the fluid conduit when the feed valve is opened, this without the need to have any controlled mechanism in the purge system.

Thanks to the presence of the pressure limiter, and to the correct choice of its limiting pressure, the source of pressurized gas delivers gas under a pressure which can exceed the pressure of fluid delivered by the source of fluid in the main conduit downstream of the feed valve, while still performing the above procedures without having any controlled mechanism in the purge system.

Figure 3:
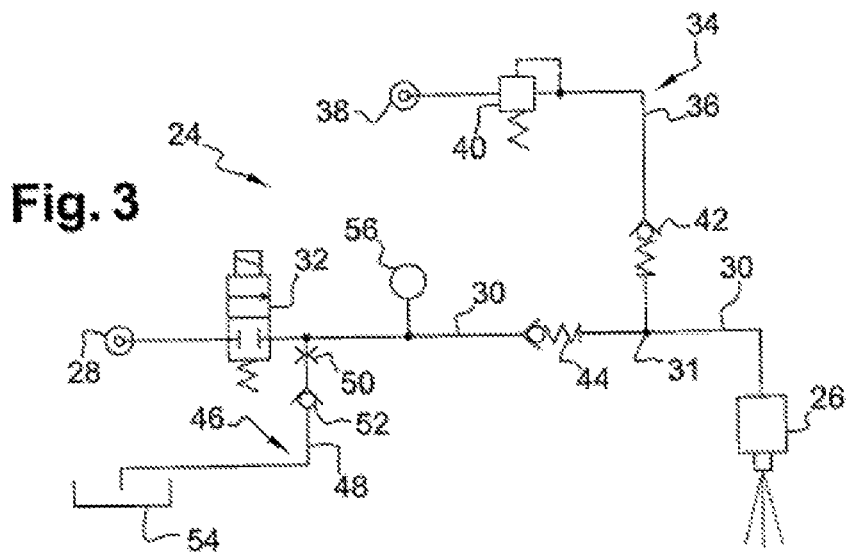
FIG. 3 is a schematic diagram showing a more refined embodiment of the invention.

On FIG. 3 is shown a second embodiment of the invention wherein the apparatus 24 comprises an additional non-return valve 44 located in the fluid conduit 30 between the feed valve 32 and the junction 31 of the gas conduit with the fluid conduit 30 for preventing backflow towards the feed valve 32. Preferably, the additional non-return valve 44 will be located as close as possible to the junction 31, so as to limit the portion of the fluid conduit 30 wherein gas will be trapped after the purge procedure.

On the other hand, it is then preferable to provide a drain system 46 for draining the portion, or otherwise venting the pressure, of the fluid conduit between the feed valve and the non-return valve, as shown on FIG. 3. Indeed, depending on the pressure in the portion of the fluid conduit 30 downstream of the non-return valve 44, and depending on the pressure drop across the non-return valve, some fluid may remain trapped between the feed valve 32 and non-return valve 44 when the former is closed. Due to the non-return valve 44, this fluid cannot be actively purged by the purge system 34. Therefore, to prevent any risk of over pressure in the intermediate portion of the fluid conduit 30 between the feed valve 32 and non-return valve 44, which can be the result of an increase in temperature of the fluid when the trapped fluid remains stagnant in that portion of the conduit 30, the drain system 46 will allow some excess fluid to be returned to a tank 54. In the embodiment shown, the drain system 46 comprises a drain conduit 48 which is branched-off the intermediate portion of the fluid conduit 30. A flow restriction 50 and a relief valve 52 are provided in the drain conduit 48 to allow some fluid to be drained in case of excess pressure in the intermediate portion of fluid conduit. Preferably, the flow restriction 50 and the relief valve 52 will be calibrated so that, at the operating pressure of the fuel conduit when both the feed valve 32 and the injector 26 are opened, no fluid or little fluid will be drained through the drain circuit 46. A pressure sensor 56 can also be provided in the intermediate portion of the fluid conduit 30 to monitor the fluid pressure therein.

Figure 4:
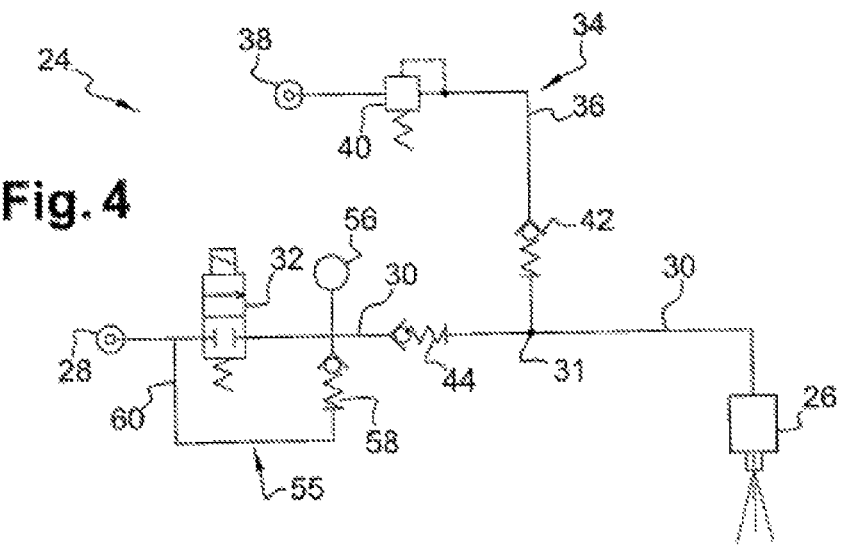
FIG. 4 is a schematic diagram showing another embodiment of the invention comprising an optional back-flow circuit by-passing the feed valve.

On FIG. 4, is shown another embodiment of the invention which is exactly similar to the embodiment of FIG. 3, except that the drain circuit 36 is replaced by a back-flow circuit 55 by-passing the feed valve 32 and equipped with a relief valve 58 allowing flow only from the intermediate portion of the fluid conduit 30 towards the fluid pressure source 28. The back-flow circuit has a back flow-conduit 60 connected to the fluid conduit 30 both upstream and downstream of the feed valve 32, and the relief valve 58 is located in that back-flow conduit 30 to prevent any forward flow through that back-flow conduit. The back flow circuit has here basically the same function as the drain circuit in FIG. 3.

Figure 5:
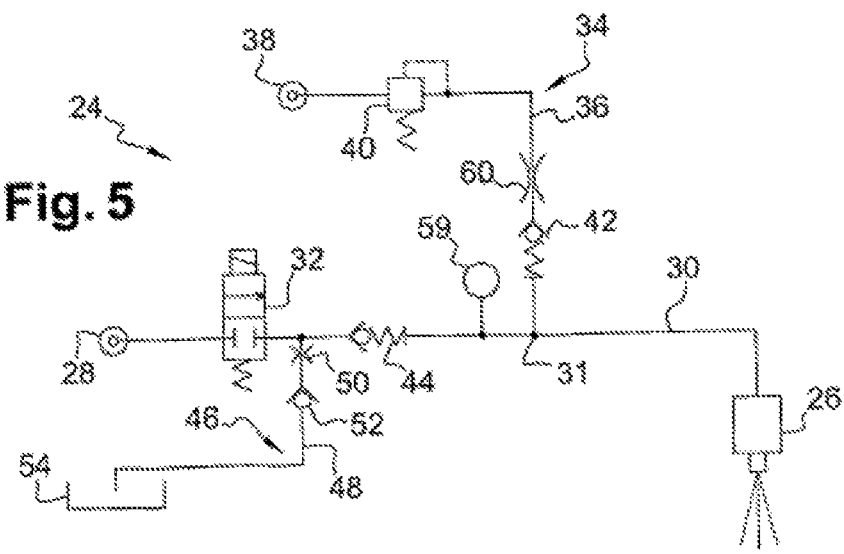
FIG. 5 is a schematic diagram showing another embodiment of the invention comprising an arrangement for monitoring leakage in the apparatus.

On FIG. 5 is shown a further embodiment which is based on the example of FIG. 3. In this embodiment, a pressure sensor 59 is provided in the fuel conduit 30 downstream of the non-return valve 44. The pressure sensor 59 could also be located in the gas conduit 36 downstream of check valve 42. The idea is here to be able to measure the pressure of fluid or of gas just upstream of the injector 26. Also, in this embodiment, it is preferable to have a flow restrictor 60' in the gas conduit, for example between the pressure limiter 40 and the check valve 42, so that the pressure sensor 59 is located downstream of the flow restrictor 60'. The flow restrictor should have flow allowance (i.e. a diameter equivalence) which is as small as possible, while still being superior to the flow allowance of the injector 26 when fully open. The flow restrictor can be a specific part in the purge circuit 34, but it can in fact be the gas conduit 36 itself, or it can be integrated within the pressure limiter or within the check valve 42.

Thanks to the flow restrictor 60' and to the pressure sensor 59, it will be possible to implement a monitoring process for detecting potential leakages occurring for example at the injector 26. The main steps of the process would include:
 a) controlling the feed valve 32 and the injector 30 to a closed position;
 b) providing a known pressure within the gas conduit 36; and
 d) measuring the gas pressure downstream of the flow restricting means, for example through pressure sensor 59;
 e) comparing the pressure measured downstream of the flow restricting means to the known pressure provided within the gas conduit.

In the context of a purge system equipped with a pressure limiter, the known pressure provided at step b) will be the pressure as limited or regulated by the limiter 40. Therefore, in case there would be a leakage downstream of the restrictor 60', such as the injector 26 remaining open despite the controlling order to be closed, or such as the fluid conduit 30 being punctured or broken, the pressure measured by sensor 59 will be considerably lower than the pressure which is supposed to be provided. Indeed, the flow restrictor 60' will impede any pressure build-up, except for leakages which would be very small in terms of flow compared to the flow allowed through the restrictor.

This process to monitor leakages is very cost effective because it requires only limited additional hardware. Also very advantageous is the fact that the detection process is carried out by using compressed gas, and preferably compressed air, and it is therefore innocuous to the atmosphere in case of leakage. Of course, the process and the associated hardware can be implemented within all the above described embodiments of the invention.

The pressure sensor 59 of FIG. 5, or the pressure sensor 56 of FIGS. 3 and 4 could also be used to perform the following leak test, with the injector 26 remaining closed. The feed valve 32 can be opened to pressurize the conduit 30 to the fluid supply pressure. The feed valve 32 is then closed and the resulting pressure decay is monitored on the pressure sensor to detect a leak.

Therefore, the apparatus according to the invention is cheap, reliable, and can be easily retrofit. Indeed, a retrofit kit can comprise either a complete apparatus for injection of a fluid for an exhaust gases treatment device of an internal combustion engine arrangement, but it can also consist in or comprise a kit comprising only the purge system. The retrofit purge system could then be mounted on any apparatus already comprising an electromagnetically controlled fluid injector fed from a source of fluid under pressure through a fluid conduit, and a feed valve in the fluid conduit between said source of fluid and said injector for controlling the delivery of fluid.

Such retrofit purge system kit would then comprise:
 a gas conduit 36 for connecting a source of pressurized gas 38 to the fuel conduit;
 a pressure limiter 40 to be fitted within said gas conduit 36; and
 a check valve 42 downstream of said pressure limiter 40 for preventing backflow from the fluid conduit 30 towards the gas source 38, and wherein the pressure limited by said pressure limiter 40 is lower than the pressure of fluid delivered by the source of fluid in the fluid conduit downstream of the feed valve.

Such a retrofit kit is easy to install and would not necessitate any additional electronic hardware or any additional electronic connection. It may only be necessary to update the computer program running the injector.

The invention claimed is:

1. An apparatus for injection of a fluid for an exhaust gases treatment device of an internal combustion engine arrangement, apparatus including:
    an electromagnetically controlled fluid injector fed from a source of fluid under pressure through a fluid conduit, and adapted to inject fluid in a flow of exhaust gases within an exhaust line of engine arrangement;
    a feed valve in the fluid conduit between source of fluid and injector for controlling the delivery of fluid;
    a purge system for purging the injector, the purge system comprising a gas conduit connecting a source of pressurized gas to the fluid conduit;
    the purge system further comprises:
    a pressure limiter within gas conduit; and
    a check valve downstream of pressure limiter for preventing backflow from the fluid conduit towards the gas source,
    wherein the pressure limited by pressure limiter is lower than the pressure of fluid delivered by the source of fluid in the fluid conduit downstream of the feed valve, and all valves of the purge system are passively controlled valves.

2. An apparatus according to claim 1, wherein the source of pressurized gas delivers gas under a pressure which exceeds the pressure of fluid delivered by the source of fluid in the fluid conduit downstream of the feed valve.

3. An apparatus according to claim 1, wherein pressurized gas is automatically delivered by the purge system to the fluid conduit when the injector is open and when the feed valve is closed.

4. An apparatus according to claim 1, wherein no gas is delivered by the purge system to the fluid conduit when the feed valve is opened.

5. An apparatus according to claim 1, wherein the check valve is integrated within the pressure limiter.

6. An apparatus according to claim 1, wherein the apparatus further comprises a non-return valve in the fluid conduit between the feed valve and the junction of the gas conduit with the fluid conduit for preventing backflow towards the feed valve.

7. An apparatus according to claim 6, wherein the apparatus further comprises a drain system for draining the portion of the fluid conduit between the feed valve and the non-return valve.

8. An apparatus according to claim 6, wherein the apparatus comprises a back-flow circuit by-passing the feed valve and equipped with a relief valve allowing flow only from the fluid conduit towards the fluid pressure source.

9. An apparatus according to claim 1, wherein the apparatus comprises a flow restrictor in the gas conduit and a pressure sensor downstream of the flow restrictor.

10. An apparatus according to claim 9, wherein the pressure sensor is located in the fluid conduit.

11. An apparatus according to claim 1, wherein the feed valve is controllable to an open position and to a closed position.

12. An apparatus according to any claim 1, wherein the feed valve is an electromagnetically controlled valve.

13. An engine arrangement equipped with an apparatus according to claim 1.

14. A kit for retrofitting a purge system on an apparatus for injection of a fluid for an exhaust gases treatment device of an internal combustion engine arrangement, the apparatus comprising:
    an electromagnetically controlled fluid injector fed from a source of fluid under pressure through a fluid conduit, and adapted to inject fluid in a flow of exhaust gases within an exhaust line of engine arrangement, upstream of treatment device;
    a feed valve in the fluid conduit between source of fluid and injector for controlling the delivery of fluid;
    the kit comprises
    a gas conduit for connecting a source of pressurized gas to the fuel conduit;
    a pressure limiter to be fitted within gas conduit; and
    a check valve to be fitted downstream of pressure limiter for preventing backflow from the fluid conduit towards the gas source, and wherein
    the pressure limited by pressure limiter is lower than the pressure of fluid delivered by the source of fluid in the fluid conduit downstream of the feed valve, and all valves in the purge system are passively controlled valves.

15. A process for detecting a leak in an apparatus for injection of a fluid for an exhaust gases treatment device of an internal combustion engine arrangement, apparatus including:
    an electromagnetically controlled fluid injector fed from a source of fluid under pressure through a fluid conduit, and adapted to inject fluid in a flow of exhaust gases within an exhaust line of engine arrangement, upstream of treatment device;
    a feed valve in the fluid conduit between source of fluid and injector for controlling the delivery of fluid;
    a purge system for purging the fluid conduit, purge system comprising a gas conduit connecting a source of pressurized gas to the fluid conduit, all valves in the purge system being passively controlled valves;
    the process comprising:
    closing the feed valve and the injector;
    providing a known pressure within gas conduit; and
    restricting the flow of gas in gas conduit by flow restricting means;
    measuring the gas pressure downstream of the flow restricting means;
    comparing the pressure measured downstream of the flow restricting means to the known pressure provided within the gas conduit.

\* \* \* \* \*